United States Patent
Lahiri et al.

(10) Patent No.: US 11,829,349 B2
(45) Date of Patent: Nov. 28, 2023

(54) DIRECT-CONNECT FUNCTIONALITY IN A DISTRIBUTED DATABASE GRID

(71) Applicant: Oracle International Corporation, Redwood Shores, CA (US)

(72) Inventors: Tirthankar Lahiri, Palo Alto, CA (US); Derek Taylor, San Jose, CA (US); Nagender Bandi, Foster City, CA (US); John Miller, Los Altos, CA (US); Chi-Kim Hoang, Palo Alto, CA (US); Ryder Rishel, Mountain View, CA (US); Varadarajan Aravamudhan, Milpitas, CA (US); Chih-Ping Wang, Palo Alto, CA (US); Susan Cheung, Cupertino, CA (US); Samuel Drake, San Jose, CA (US); Paul Tuck, Swindon (GB); David Aspinwall, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 780 days.

(21) Appl. No.: 14/709,018

(22) Filed: May 11, 2015

(65) Prior Publication Data

US 2016/0335310 A1   Nov. 17, 2016

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
CPC ......... G06F 17/30377; G06F 17/30575; G06F 9/466; G06F 16/2379; G06F 16/27
(Continued)

(56) References Cited

U.S. PATENT DOCUMENTS 4,881,166 A * 11/1989 Thompson .............. G06F 16/25
5,649,156 A    7/1997 Vishlitzky et al.
(Continued)

FOREIGN PATENT DOCUMENTS

EP          2 608 070 A1   6/2013
WO    WO2007/045839 A2   4/2007
(Continued)

OTHER PUBLICATIONS

Anonymous: "Transaction Handling", dated Jan. 1, 2002, https://docs.oracle.com/cd/A87860_01/doc/java.817/a83725/trans1.htm, 12 pages.

(Continued)

*Primary Examiner* — Christopher J Raab
(74) *Attorney, Agent, or Firm* — Hickman Becker Bingham Ledesma LLP

(57) ABSTRACT

A database is stored as a plurality of database shards in a distributed database grid comprising a plurality of grid elements, each including a mid-tier database system. A first grid element receives, from an application executing in the same memory as a mid-tier database system of the first grid element, a first database transaction including at least one database operation on specific data stored in a first database shard that belongs to the first grid element. The first grid element performs and commits the first database transaction without participation of another grid element of the plurality of grid elements. The first grid element receives a second database transaction that requires access to another database shard that does not belong to the first grid element. Multiple grid elements of the plurality of grid elements perform the second database transaction and commit the second database transaction using a two-phase commit protocol.

20 Claims, 6 Drawing Sheets

(58) Field of Classification Search
USPC .................................................. 707/615
See application file for complete search history.

(56) References Cited

U.S. PATENT DOCUMENTS

| | | |
|---|---|---|
| 5,742,792 A | 4/1998 | Yanai et al. |
| 5,778,430 A | 7/1998 | Ish et al. |
| 5,870,761 A | 2/1999 | Demers et al. |
| 5,893,086 A | 4/1999 | Schmuck |
| 5,953,719 A * | 9/1999 | Kleewein ............... G06F 16/252 |
| 6,009,432 A | 12/1999 | Tarin |
| 6,243,838 B1 | 6/2001 | Liu et al. |
| 6,370,622 B1 | 4/2002 | Chiou et al. |
| 6,611,898 B1 | 8/2003 | Slattery et al. |
| 7,149,769 B2 | 12/2006 | Lubbers et al. |
| 7,548,898 B1 | 6/2009 | Tarenskeen et al. |
| 7,570,451 B2 | 8/2009 | Bedillion et al. |
| 7,647,443 B1 | 1/2010 | Chatterjee et al. |
| 7,693,886 B1 | 4/2010 | Novick |
| 7,912,051 B1 | 3/2011 | Rowlands et al. |
| 7,917,539 B1 | 3/2011 | Srinivasan |
| 7,962,458 B2 * | 6/2011 | Holenstein ........... G06F 16/2343 707/704 |
| 8,145,838 B1 | 3/2012 | Miller et al. |
| 8,433,684 B2 | 4/2013 | Munoz |
| 8,856,484 B2 | 10/2014 | Ben-Tsion et al. |
| 8,930,647 B1 | 1/2015 | Smith |
| 9,164,702 B1 * | 10/2015 | Nesbit ................ G06F 15/17331 |
| 9,292,564 B2 | 3/2016 | Kamp et al. |
| 9,514,187 B2 * | 12/2016 | Ziauddin ........... G06F 16/24542 |
| 10,133,667 B2 | 11/2018 | Mukherjee et al. |
| 10,148,548 B1 * | 12/2018 | Griffin ................. H04L 41/142 |
| 10,223,326 B2 | 3/2019 | Frank et al. |
| 10,311,154 B2 * | 6/2019 | Lahiri ................... G06F 16/278 |
| 10,592,416 B2 | 3/2020 | Baddepudi et al. |
| 2003/0005223 A1 | 1/2003 | Coulson |
| 2003/0046298 A1 * | 3/2003 | Weedon ................. G06F 9/466 |
| 2003/0217236 A1 | 11/2003 | Rowlands |
| 2004/0073754 A1 | 4/2004 | Cypher |
| 2004/0122910 A1 | 6/2004 | Douglass et al. |
| 2004/0199552 A1 | 10/2004 | Ward et al. |
| 2004/0225719 A1 | 11/2004 | Kisley et al. |
| 2005/0055380 A1 | 3/2005 | Thompson et al. |
| 2006/0010130 A1 | 1/2006 | Leff et al. |
| 2006/0149786 A1 * | 7/2006 | Nishiyama ............ H04L 41/024 |
| 2007/0239791 A1 * | 10/2007 | Cattell ..................... G06F 16/27 |
| 2008/0059492 A1 | 3/2008 | Tarin |
| 2008/0098044 A1 | 4/2008 | Todd |
| 2008/0155303 A1 | 6/2008 | Toeroe |
| 2008/0177803 A1 * | 7/2008 | Fineberg .............. G06F 16/2358 |
| 2008/0209009 A1 | 8/2008 | Katwala et al. |
| 2008/0215580 A1 | 9/2008 | Altinel et al. |
| 2008/0222159 A1 | 9/2008 | Aranha et al. |
| 2008/0256250 A1 | 10/2008 | Wakefield |
| 2008/0281784 A1 | 11/2008 | Zane et al. |
| 2008/0281865 A1 | 11/2008 | Price et al. |
| 2008/0282055 A1 | 11/2008 | Yang |
| 2008/0222111 A1 | 12/2008 | Hoang et al. |
| 2009/0030911 A1 * | 1/2009 | Guo ........................ G06F 16/40 |
| 2009/0171679 A1 | 7/2009 | Salgado et al. |
| 2009/0240664 A1 * | 9/2009 | Dinker ..................... G06F 16/27 |
| 2009/0292861 A1 | 11/2009 | Kanevsky |
| 2009/0313311 A1 * | 12/2009 | Hoffmann ............ G06F 11/2097 |
| 2010/0235335 A1 | 9/2010 | Heman et al. |
| 2010/0250549 A1 | 9/2010 | Muller et al. |
| 2010/0306234 A1 | 12/2010 | Wang et al. |
| 2011/0029569 A1 | 2/2011 | Ganesh et al. |
| 2011/0041006 A1 * | 2/2011 | Fowler .................. G06F 9/5072 714/10 |
| 2011/0071981 A1 * | 3/2011 | Ghosh .................... G06F 16/27 707/634 |
| 2011/0072217 A1 * | 3/2011 | Hoang ................... G06F 16/22 711/130 |
| 2011/0138123 A1 | 6/2011 | Aditya et al. |
| 2011/0173325 A1 | 7/2011 | Cherian et al. |
| 2012/0017037 A1 | 1/2012 | Riddle |
| 2012/0158650 A1 * | 6/2012 | Andre ............... G06F 16/24539 707/611 |
| 2012/0158729 A1 | 6/2012 | Mital |
| 2012/0173515 A1 | 7/2012 | Jeong et al. |
| 2012/0173844 A1 | 7/2012 | Punde et al. |
| 2012/0246202 A1 * | 9/2012 | Surtani ................. G06F 16/258 707/812 |
| 2012/0265743 A1 * | 10/2012 | Ivanova ............... G06F 16/2379 707/702 |
| 2012/0323970 A1 | 12/2012 | Larson |
| 2012/0323971 A1 | 12/2012 | Pasupuleti |
| 2013/0019000 A1 * | 1/2013 | Markus .................. G06F 9/466 709/223 |
| 2013/0066949 A1 * | 3/2013 | Colrain ................... G06F 9/466 709/203 |
| 2013/0290462 A1 | 10/2013 | Lim et al. |
| 2013/0290598 A1 * | 10/2013 | Fiske .................... G06F 3/0625 711/103 |
| 2013/0339572 A1 | 12/2013 | Fanning et al. |
| 2014/0012814 A1 * | 1/2014 | Bercovici ........... G06F 16/2379 707/636 |
| 2014/0012867 A1 | 1/2014 | Moss et al. |
| 2014/0040218 A1 | 2/2014 | Kimura et al. |
| 2014/0047263 A1 | 2/2014 | Coathney |
| 2014/0075493 A1 | 3/2014 | Krishnan et al. |
| 2014/0108421 A1 * | 4/2014 | Isaacson ............. G06F 16/2255 707/747 |
| 2014/0143364 A1 | 5/2014 | Guerin |
| 2014/0200166 A1 | 7/2014 | Van Rooyen |
| 2014/0208062 A1 | 7/2014 | Cohen |
| 2014/0337593 A1 | 11/2014 | Holbrook |
| 2014/0372486 A1 * | 12/2014 | Bose ........................ G06F 16/27 707/792 |
| 2014/0372489 A1 * | 12/2014 | Jaiswal .............. G06F 16/2365 707/812 |
| 2014/0372702 A1 * | 12/2014 | Subramanyam .... G06F 12/0848 711/129 |
| 2015/0006482 A1 * | 1/2015 | Hardy ................. G06F 16/2365 707/613 |
| 2015/0039712 A1 * | 2/2015 | Frank ....................... G06F 13/28 709/212 |
| 2015/0067087 A1 * | 3/2015 | Guerin .................... G06F 12/10 709/212 |
| 2015/0088811 A1 * | 3/2015 | Hase ........................ G06F 16/23 707/607 |
| 2015/0088822 A1 | 3/2015 | Raja et al. |
| 2015/0088824 A1 | 3/2015 | Kamp et al. |
| 2015/0088830 A1 * | 3/2015 | Kamp ................... G06F 11/2058 707/648 |
| 2015/0088926 A1 | 3/2015 | Chavan et al. |
| 2015/0089125 A1 | 3/2015 | Mukherjee et al. |
| 2015/0089134 A1 * | 3/2015 | Mukherjee .......... G06F 15/8084 711/114 |
| 2015/0150017 A1 * | 5/2015 | Hu .......................... G06F 12/00 718/103 |
| 2015/0187430 A1 | 7/2015 | Suzuki |
| 2015/0317349 A1 * | 11/2015 | Chao ..................... G06F 16/278 707/615 |
| 2016/0026399 A1 | 1/2016 | Purkayastha et al. |
| 2016/0103767 A1 | 4/2016 | Banerjee et al. |
| 2016/0132411 A1 | 5/2016 | Jolad et al. |
| 2016/0132432 A1 | 5/2016 | Shen et al. |
| 2016/0306574 A1 | 10/2016 | Friedman |
| 2016/0306923 A1 | 10/2016 | Van Rooyen |
| 2016/0308968 A1 | 10/2016 | Friedman |
| 2016/0328301 A1 | 11/2016 | Parakh et al. |
| 2016/0371347 A1 | 12/2016 | Aronovich |
| 2017/0109317 A1 * | 4/2017 | Hack ................... H04L 67/2847 |
| 2017/0269837 A1 | 9/2017 | Stevens |
| 2017/0300592 A1 | 10/2017 | Breslow |
| 2018/0011893 A1 | 1/2018 | Kimura |
| 2018/0321846 A1 | 11/2018 | Zhang |

(56) References Cited

U.S. PATENT DOCUMENTS

2018/0341596 A1 11/2018 Teotia
2019/0042410 A1 2/2019 Gould et al.

FOREIGN PATENT DOCUMENTS

WO WO 2007/078444 A1 7/2007
WO WO 2015/094179 A1 6/2015

OTHER PUBLICATIONS

Anonymous: "Chapter 6 Handling Transactions with Enterprise Beans", dated Jan. 1, 2004, https://docs.oracle.com/cd/E19229-01/819-1644/detrans.html, 16 pages.
U.S. Appl. No. 14/337,183, filed Jul. 21, 2014, Notice of Allowance, dated Apr. 24, 2015.
U.S. Appl. No. 14/337,183, filed Jul. 21, 2014, Office Action, dated Jan. 13, 2015.
U.S. Appl. No. 13/101,783, filed May 5, 2011, Notice of Allowance, dated Sep. 25, 2012.
U.S. Appl. No. 12/562,928, filed Sep. 18, 2009, Office Action, dated May 17, 2012.
U.S. Appl. No. 12/719,264, filed Mar. 8, 2010, Office Action, dated Jan. 19, 2012.
U.S. Appl. No. 12/719,264, filed Mar. 8, 2010, Office Action, dated May 10, 2012.
U.S. Appl. No. 12/719,264, filed Mar. 8, 2010, Notice of Allowance, dated Aug. 27, 2012.
U.S. Appl. No. 12/719,264, filed Mar. 8, 2010, Restriction Requirement, dated Nov. 18, 2011.
Schaffner et al., "A Hybrid Row-Column OLTP Database Architecture for Operational Reporting", Business Intelligence for the real-time Enterprise, dated Aug. 24, 2008, 14 pages.
Ramamurthy, Ravishankar, "A Case for Fractured Mirrors" Proceedings of the 28th VLDB Conference, dated, 2002, 12 pages.
Nirmesh, Malviya, "Recovery Algorithms for In-Memory OLTP Databases", Master of Science Thesis, dated Jul. 1, 2012, 66 pages.
Farber et al., "Sap Hana Database—Data Management for Modern Business Applications", SIGMOD Record, dated Dec. 2011, vol. 40, No. 4, 8 pages.
Oracle®, "TimesTen to TimesTen Replication Guide" Release 7.0, B31684-03, Sep. 2007. http://download.oracle.com/otn_hosted_doc/timesten/703/TimesTen-Documentation/replication.pdf.
Oracle®, "TimesTen to TimesTen In-Memory Database Introduction" Release 7.0, B31687-03, Sep. 2007. http://download.oracle.com/otn_hosted_doc/timesten/703/TimesTen-Documentation/intro.pdf.
Oracle® Clusterware, Administration and Deployment Guide, 11g Release 1 (11.1), B28255-06, Oct. 2008. http://download.oracle.com/docs/cd/B28359_01/rac.111/b28255.pdf.
The Times Ten Team, Mid-Tier Caching: The Times Ten Approach, Jun. 2002. ACM SIGMOD, 6 pages.
Feng et al., "Accelerating Relational Databases by Leveraging Remote Memory and RDMA", Proceedings of the 2016 International Conference on Management of Data, SIGMOD, Jan. 1, 2016, pp. 355-370.
Tao, U.S. Appl. No. 15/720,972, filed Sep. 29, 2017, Office Action, dated Sep. 13, 2018.

Loaiza, U.S. Appl. No. 15/693,273, filed Aug. 31, 2017, Office Action, dated Oct. 2, 2018.
Rest, U.S. Appl. No. 15/409,091, filed Jan. 18, 2017, Notice of Allowance, dated May 14, 2019.
Tao, U.S. Appl. No. 15/720,972, filed Sep. 29, 2017, Final Office Action, dated Jan. 24, 2019.
Meiyyappan, U.S. Appl. No. 15/721,328, filed Sep. 29, 2017, Office Action, dated Nov. 29, 2019.
Wikipedia, the free encyclopedia, "Cuckoo Hasing", https://en.wikipedia.org/wiki/Cuckoo_hashing, last viewed on Jul. 31, 2017, 7 pages.
Wang et al., "C-Hint: An Effective and Reliable Cache Management for RDMA Accelerated Key-Value Stores", dated 2014, 2 pages.
Tyler Szepesi, et al. "Nessie: A Decoupled, Client-Driven, Key-Value Store using RDMA", Copyright 2015 the authors CS-2015-09, 13 pages.
Szepesi, Tyler, et al. "Designing a low-latency cuckoo hash table for write-intensive workloads using RDMA." First International Workshop on Rack-scale Computing. 2014, 6 pages.
Pavlo, Andy, "15-721 Database Systems", Lecture #23 Non-Volatile Memory, dated Spring 2016, 70 pages.
Mitchell et al., "Using One-Sides RDMA Reads to Build a Fast, CPU-Efficient Key-Value Store" dated 2013, 12 pages.
Kalia et al., "Using RDMA Efficiently for Key-Value Services", SIGCOMM'14, Aug. 17-22, 2014, Chicago, IL, USA, 15 pages.
Kalia et al., "Using RDMA efficiently for key-value services", dated 2014, 2 pages. Kalia et al., "Using RDMA Efficiently for Key-Value Services", ACM SIGVOMM, https://www.researchgate.net/publication/266659972_Using_RDMA_Eff, 5 pages, Aug. 2014.
Fan et al., "MemC3: Compact and Concurrent MemCache With Dumber Caching and Smarter Hashing", NSDI'13, dated Apr. 2013, 14 pages.
Dragojević, et al., "FaRM: Fast Remote Memory", https://www.usenix.org/conference/nsdi14/technical-sessions/dragojevic, dated Apr. 2014, 15 pages.
Tao, U.S. Appl. No. 15/720,972, filed Sep. 29, 2017, Final Office Action, dated Jan. 6, 2020.
Loaiza, U.S. Appl. No. 15/693,273, filed Aug. 31, 2017, Notice of Allowance, dated Jan. 27, 2020.
Shi, U.S. Appl. No. 15/720,949, filed Sep. 29, 2017, Office Action, dated Oct. 4, 2019.
Choudhury, U.S. Appl. No. 15/720,959, filed Sep. 29, 2017, Office Action, dated Oct. 4, 2019.
Tao, U.S. Appl. No. 15/720,972, filed Sep. 29, 2017, Notice of Allowance, dated Nov. 4, 2020.
Meiyyappan, U.S. Appl. No. 15/721,328, filed Sep. 29, 2017, Office Action, dated Nov. 13, 2020.
Mciyyappan, U.S. Appl. No. 15/721,328, filed Sep. 29, 2017, Notice of Allowance, dated Jun. 15, 2020.
Shi, U.S. Appl. No. 15/720,949, Filed 09/269/2017, Notice of Allowance, dated Mar. 25, 2020.
Meiyyappan et al., U.S. Appl. No. 15/721,328, filed Sep. 29, 2017, Corrected Notice of Allowability, dated Jul. 9, 2021.
Meiyyappan et al., U.S. Appl. No. 15/721,328, filed Sep. 29, 2017, Notice of Allowance, dated Mar. 16, 2021.
Meiyyappan et al., U.S. Appl. No. 15/721,328, filed Sep. 29, 2017, Corrected Notice of Allowability, dated Jun. 1, 2021.
Loaiza et al., U.S. Appl. No. 16/907,703, filed Jun. 22, 2020, Non-Final Office Action, dated Aug. 13, 2021.

* cited by examiner

DIRECT-CONNECT FUNCTIONALITY IN A DISTRIBUTED DATABASE GRID

FIELD OF THE INVENTION

Embodiments of the invention described herein relate generally to databases, and, more specifically, to distributed grid databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database server governs and provides access to a particular database. Users interact with a database server of a DBMS by submitting commands that cause the database server to perform operations on data stored in a database. A user may be one or more client applications and/or client processes running on a client computer. Multiple users may also be referred to herein collectively as a user.

Conceptually, the above described interactions are characterized as occurring across multiple tiers. The computing devices implementing components at each level may be physically distinct from the computing devices at each other level. However, physical separation is not strictly necessary. A three-tier scheme for a data application is commonly used. The "presentation tier" typically involves the end user operating a client. For example, an end user may operate a web browser or other user interface to request online services such as booking a flight, and a user may operate a cell phone to request a telephone service.

The "mid-tier" typically refers to any component that responds to presentation tier requests by interacting with data originating from one or more backend data sources, such as a backend database server. For example, a mid-tier web application may provide a presentation tier web interface for booking a flight to a user, and in response to requests from the user, send one or more requests to a database server to obtain flight data. As another example, mid-tier cellular switching software may rely on data from a database server to determine how to respond to a cell phone's request to make a call.

The "data tier" involves one or more data sources, such as a file system, web server, or a database server and database. For example a data-tier database may comprise one or more of the following: a persistent database stored at one or more persistent storage devices; a database server that interacts directly with the persistent storage device to provide access to logical structures stored in the one or more persistent databases; and other components that manage the persistent storage devices or the backend database servers. When a mid-tier application accesses a data tier database, at least one round trip network access is required.

For some applications, it is advantageous to implement one or more database systems as mid-tier systems rather than conventional data-tier systems, thereby avoiding network-based delays. Mid-tier database systems provide mid-tier applications with faster access to data by bringing the data closer to the applications.

Some mid-tier database systems take this one step further, and support direct mode. As used herein, the term "direct mode" refers to the running of database software in the same address space as one or more mid-tier applications, further reducing the overhead of accessing the database from the one or more mid-tier applications. An application may run in direct mode by, for example, linking the application to database server software provided as an executable library that can be linked with an application. No inter-process communication is required in direct mode because the application is able to access the data stored in the shared address space.

In a single mid-tier system, the implementation of direct mode is fairly straightforward. However, if there are multiple mid-tier systems, each with a separate mid-tier database, then it becomes challenging for the mid-tier database systems to provide a single image of the data, which may be distributed across the mid-tier database systems. Thus, the scalability of such a system is limited. Thus, there is a need for direct-connect functionality in a distributed database grid.

DETAILED DESCRIPTION

Figure 1:
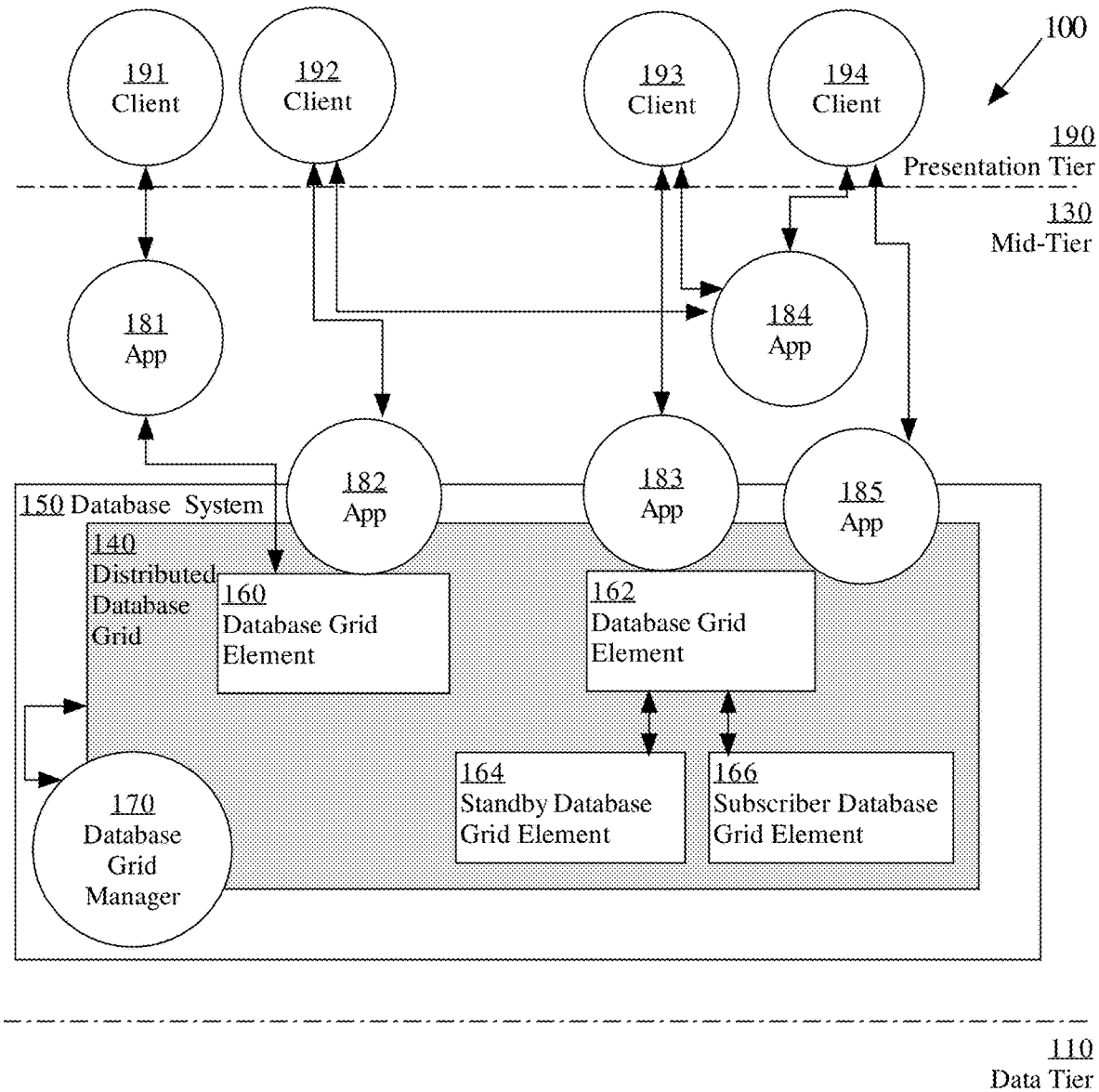
FIG. 1 is a block diagram of an embodiment of a system on which the techniques described herein may be practiced.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Approaches, techniques, and mechanisms are disclosed for providing direct-connect functionality in a database grid comprising a plurality of database grid elements. A scalable grid architecture is configured to provide access to the entire database as a single image while retaining direct-connect functionality between a particular database grid element and an application running on the same host system as the particular database grid element.

As used herein, the term "database grid element" refers to a mid-tier in-memory database system hosted on a mid-tier host. A grid element includes a database, or a database shard of a larger database, which shall be described in greater detail hereafter. A grid element further includes database software for accessing and managing the database or database shard. An important feature of a database grid element is that it supports several modes for accessing a database: direct mode and remote connect mode.

In remote connect mode, a process running an application sends a request to access the database of a grid element to another process on the host of the grid element. The request may pertain to the database shard that is local to the grid element or may pertain to other data stored on other grid elements. For example, to support this mode, a grid element may include one or more daemon processes running on the host that are responsible for servicing requests sent using the remote connect mode. Such a daemon process is referred to herein as a proxy server. In many respects, a proxy server functions as a database server.

A grid element may be referred to herein as executing and performing an operation or other action. When a grid element is referred to in this way, it may mean that a process running in direct mode or a proxy server is performing the operation or action.

Distributed Database Grid

A distributed database grid comprises a plurality of database grid elements which provide a single image of a database stored across a plurality of database grid elements. Each database grid element holds a portion of the database referred to herein as a "database shard" or "shard".

Any application running in direct mode with a grid element of the distributed database grid can access data in the entire database. However, when accessing a shard of another grid element, the shard is accessed using remote connect mode.

For example, an application process may run in direct mode with a particular database grid element that holds a particular database shard. The application process may query the entire database, including database shards held by other database grid elements of the distributed database grid. When the data being queried actually resides in the database shard of another database grid element, a request is sent to a proxy server of the other data grid element. In one embodiment, the request is sent transparently by the application because the application process's execution of the linked-in database software causes the request to be sent.

Because the database is partitioned across a set of database grid elements, it is often possible to route requests from the "presentation tier" to the particular grid element that holds the only shard needed to service the request. Thus, in the example request to bill for phone calls within the specific area code, the request can be handled completely in direct mode. Such a system provides most of the performance benefits of a single system direct-mode mid-tier database while providing the scalability that modern applications require.

The distributed database grid allows an application access in remote connect mode and direct mode. In remote connect mode, applications communicate with the database software by sending messages from the application to the distributed database grid using a communication protocol such as TCP/IP. In direct mode, application processes can access, in direct mode, a particular database grid element that resides on the same host system. Rather than sending a message to the database system, the application simply calls the database system, such as through an API. Thus, the shard of data stored by the database grid element that is resident on the same host system can be accessed "directly" by the application with no network communication overhead.

According to an embodiment, when a request from the "presentation tier" is sent to a distributed database grid, the request is routed to the grid element which holds the database shard needed to handle the request. For example, in a telephone billing system, if all data for customers is partitioned by area code, then requests to bill for phone calls within a specific area code can all be routed to a single grid element storing a shard holding data for the specific area code.

Regardless of whether direct mode or remote connect mode is used, a database grid element can perform one or more database operations independently of the other grid elements of the distributed database grid when operating on data which is physically stored in the shard of the database grid element. For example, an instance of a mid-tier application may execute within a database grid element that stores a particular shard in accordance with a distribution scheme. When a database access request by the application instance is limited to the particular database shard, the application instance may read and write directly to the particular shard without incurring the typical overheads of a distributed database access. In an embodiment, application instances of a distributed application are partitioned in accordance with the distribution scheme for the data set, thereby increasing data co-location between application instances and database grid elements.

Applications may access the mid-tier database grid as one logical database without handling any operational detail with respect to data location. Any database shard can be accessed transparently without knowledge of the distribution scheme. In addition, database operations may span more than one database grid element. In one embodiment, a distributed application with knowledge of the distribution scheme of a data set may configure application instances that are co-located with the proper database shards to access the respective database grid elements in direct mode. Such accesses which only reference data which is located on the local element will incur no network overhead. Applications can access data which is present on other database grid elements in the distributed database grid, but will incur communication overhead for such accesses.

In one embodiment, the distributed in-memory database grid is provided in a scale-out architecture that maintains ACID compliance and SQL functionality. ACID refers to a set of properties that guarantee reliable database transaction processing: atomicity, consistency, isolation and durability. The architecture maintains low response times and drastically reduces latency for direct-connect access, which is essential to real-time applications that require real-time response time such as phone call routing, authentication and authorization, real-time billing, securities trading, fraud detection, online banking, and the like.

An embodiment is directed to a method for providing direct-connect functionality in a distributed database grid. A database is stored in a distributed database grid that includes a plurality of grid elements. The database is distributed across the plurality of grid elements in accordance with a distribution scheme for the database. A particular grid element storing a specific shard of a database receives a first database transaction from an application over a direct connection between the application and the particular grid element. The database transaction includes at least one database operation on the specific data. The specific grid element performs the first database transaction and commits the first database transaction without participation of another grid element of the plurality of grid elements. If the distributed database grid element receives a second database transaction which includes database operations on data which is stored in multiple elements of the distributed database grid, then the second database transaction is performed on each of those elements in the distributed database grid. The second database transaction is committed across those database elements using a two-phase commit protocol.

In other aspects, a computer apparatus and a computer-readable medium are configured to carry out the foregoing steps.

Structural Overview

FIG. 1 is a block diagram of an embodiment of a system on which the techniques described herein may be practiced. The components of system 100 are described in greater detail below. Other systems may include more or fewer components in different arrangements. Moreover, the distribution of work between components may vary from system to system. System 100 comprises presentation tier 190, mid-tier 130 and optionally data tier 110.

Presentation tier 190 includes clients 191-194. Clients 191-194 may include client-side applications, such as web browsers, desktop applications, mobile applications, and other client-side applications. Clients 191-194 request services from mid-tier applications 181-185.

Mid-tier 130 comprises applications 181-185. Applications 181-185 may include one or more web applications, servers, service providers, and/or other applications and/or services. In one embodiment, applications 181-185 include one or more distributed applications. As used herein, the term "application" refers to a unit of executable software that includes instructions executable by a system comprising one or more processors, including any distributed application and/or any instance thereof. In an embodiment, one or more of mid-tier applications 181-185 are not provided by a vendor of database system 150. For example, one or more mid-tier applications may be developed by a third party. Alternatively, one or more of mid-tier applications 181-185 may be an application provided by a database system vendor. To provide the services requested by clients 191-194, mid-tier applications 181-185 rely on data in database system 150, and are configurable to access data stored in database system 150.

Database system 150 includes one or more mid-tier components. Although one or more components of database system 150 are shown to reside in mid-tier 130, database system 150 may include one or more other components in data tier 110, including but not limited to backup components and/or legacy components. Alternatively, database system 150 may completely reside in mid-tier 130.

Database system 150 includes mid-tier distributed database grid 140. Distributed database grid 140 comprises a plurality of database grid elements 160-162. Each database grid element 160-162 includes data and one or more daemon processes that perform database functionality such that each database grid element 160-162 can function as a self-contained mid-tier database system. Daemon processes may not only comprise one or more proxy servers but may also comprise one or more processes responsible for various resource management tasks at their respective database grid elements, such as maintaining and reporting statistics regarding data usage and connections, managing shared memory access and policies, and starting and/or recovering various components of their respective mid-tier database grid elements. Database grid elements 160-162 may further comprise any number of additional components as needed.

In one embodiment, each database grid element 160-162 stores an assigned database shard in a memory space in volatile memory, such as in RAM. Database grid elements 160-162 may share the memory space with other applications running on the same host system to facilitate direct mode access. Database grid elements 160-162 may be hosted on server blades interconnected with other server blades on a rack and/or heterogeneous computing units that may or may not be physically coupled.

Database grid elements 160-162 may be implemented on separate host computing devices. Alternatively and/or in addition, one or more of database grid elements 160-162 may be implemented on a shared host computing device. In one embodiment, each database grid member 160-162 has its own transaction log files and checkpoint files which are persisted to disk. In the event of a system restart or failure, the in-memory database is recovered from the checkpoint and transaction log files.

In an embodiment, one or more database grid elements 160-162 comprise an in-memory database that resides entirely in volatile memory at run time and is persisted to disk storage for the ability to recover and restart, such as but not limited to an Oracle TimesTen™ database. TimesTen™ provides full transactional support for SQL operations and the transaction logs are persisted to disk for recovery.

Database grid elements 160-162 are all considered part of the same distributed database grid 140 because they each store a separate database shard of a database which can be accessed as a single image through any of database grid elements 160-162. Database grid elements 160-162 are capable of independently responding to database commands from applications 181-185 by retrieving and/or manipulating the data stored in their respective database shard. Database grid elements 160-162 are also configured to participate in a distributed database operations, which shall be described in greater detail hereafter.

Mid-tier applications 181-185 may access the database through database grid elements 160-162, either through a direct connection to a particular database grid element, or through remote connect mode. For example, mid-tier applications 182-183 and 185 are configured to access database grid elements 160-162 via direct mode, such as when mid-tier application 182 runs on the same host system as database grid element 160, and mid-tier applications 183 and 185 run on the same host system as database grid element 162. Mid-tier applications may also access the database in remote connect mode, such as mid-tier application 181 and mid-tier application 184. In one embodiment, one or more of mid-tier applications 181-185 are sharded application instances that take advantage of co-location based on the distribution scheme of the data stored in distributed database grid 140. A sharded application instance shall be described in greater detail hereafter.

Mid-tier applications 181-185 may access multiple database shards of database grid elements 160-162 as a distributed operation managed by database grid manager 170, as shall be explained in greater detail. In an embodiment, database system 150 may not have any centralized database grid manager such as database grid manager 170. Database grid manager 170 may be configured as a component of distributed database grid 140, or as another mid-tier 130 component of database system 150, or as a data-tier 110 component of database system 150.

In one embodiment, a database grid element may be a member of multiple distributed database grids. For example, a first distributed database grid may include database grid elements 160-162, while a second distributed database grid may include a plurality of database grid elements that includes database grid element 162 but not database grid element 160. Furthermore, a particular database grid element may be an active database grid element for one database shard, and a standby database grid element or a subscriber database grid element for another database shard.

Database grid elements 160-162 are active database grid elements of distributed database grid 140. In addition to active database grid elements 160-162, distributed database grid 140 may also include one or more standby database grid elements 164. Standby database grid element 164 is kept consistent, either synchronously or asynchronously, with transactions at a corresponding active database grid element 162 so that if active database grid element 162 fails, the standby database grid element 164 may take the place of active database grid element 162 with minimal recovery efforts. Distributed database grid 140 may feature one or more standby database grid elements for any particular database grid element, or alternatively no standby database grid elements.

In addition to active database grid elements 160-162, distributed database grid 140 may also include one or more subscriber database grid elements 166 configured to provide read-only access to a database shard corresponding to an associated database grid element 162. In an embodiment, changes at the associated database grid element 162 are replicated or otherwise propagated to subscriber database grid elements 166 less frequently than to standby database grid element 162. Distributed database grid 140 may feature one or more subscriber database grid elements for any particular database grid element, or alternatively no subscriber database grid elements.

Distributed database grid 140 may also include one or more spare database grid elements that do not store any particular database shard. A spare database grid element may be utilized for recovering from failures at any of database grid elements 160-166, and may replace any of database grid elements 160-166 when they are unable to recover from a failure. In an embodiment, any number of spare database grid elements may be specified for distributed database grid 140, or alternatively no spare database grid elements are specified.

Deploying Sharded Application Instances

Figure 2:
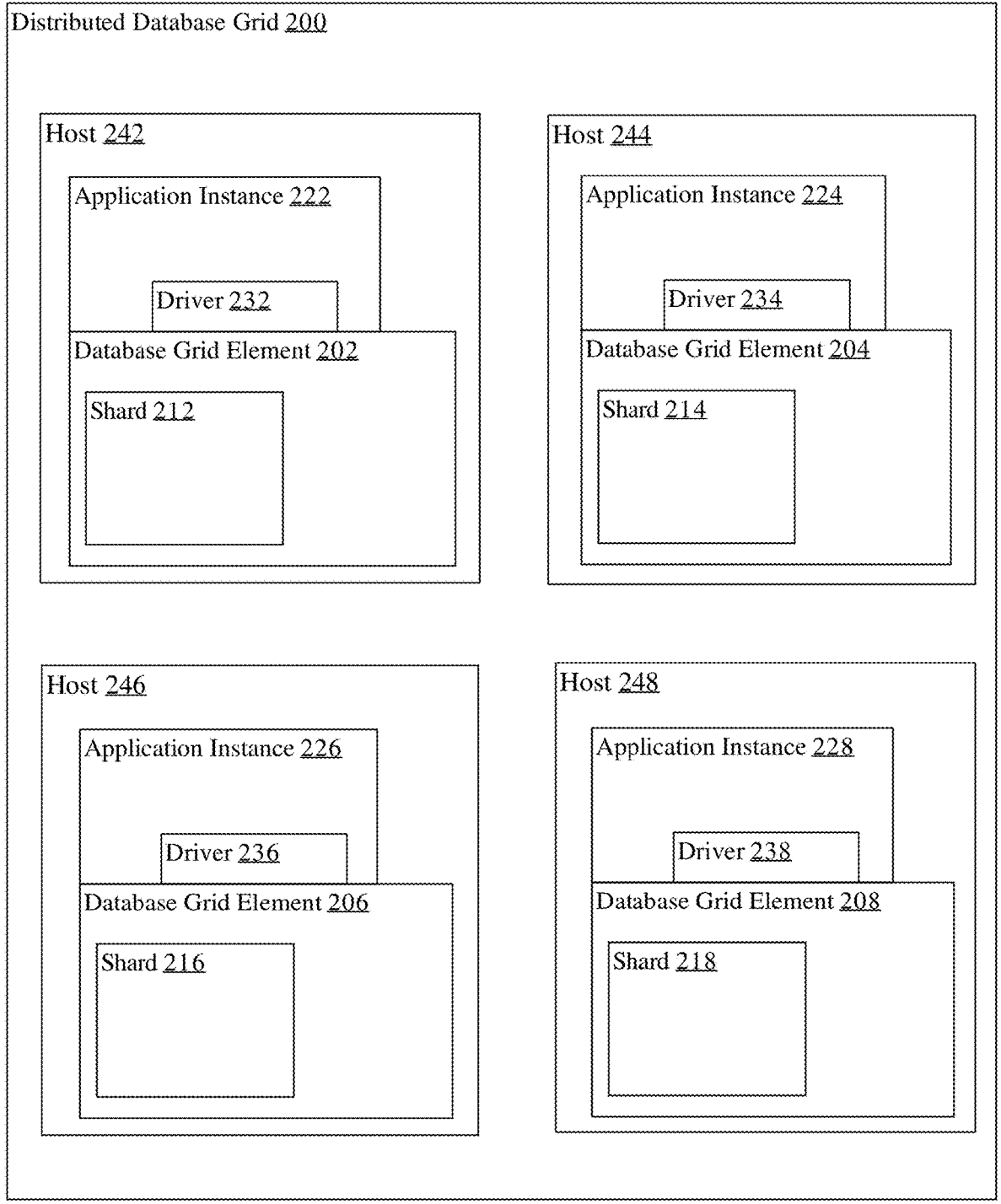
FIG. 2 is a block diagram of an embodiment of a mid-tier database grid.

FIG. 2 is a block diagram of an embodiment of a mid-tier distributed database grid. Distributed database grid 200 includes a plurality of database grid elements 202-208 of a mid-tier distributed database grid 200 and a plurality of application instances 222-228 of a distributed application. FIG. 2 is an example of a system capable of implementing the techniques described herein. Other systems may include more or fewer components in different arrangements. Moreover, the distribution of work between components may vary from system to system.

Hosts 242-248 are mid-tier computing devices that execute mid-tier application instances 222-228. Application instances 222-228 are executing instances of a distributed application. Hosts 242-248 may further comprise or communicate with any number of additional applications, including other distributed applications.

Distributed database grid 200 is configured to allow database access in two different modes: remote connect mode and direct mode. Thus, an application may selectively access the database in either direct mode or remote connect mode.

Database grid elements 202-208 are deployed in mid-tier 130. Any task described or implied as being performed by a database grid element should be understood as being performed by any one or more processes executing at the corresponding host 242-248 or in association with the database grid element 202-208. Similarly, tasks described or implied as being performed by hosts 242-248 should be understood as being performed by any one or more processes executing at hosts 242-248.

Database grid elements 202-208 are configured to store a database shard of a database that is distributed across database grid elements 202-208 in accordance with a distribution scheme, which shall be described in greater detail hereafter. Database grid elements 202-208 may further comprise additional components stored in a volatile memory, including indexes and temporary space. Other components of database grid elements 202-208 may include transaction logs and recovery data, such as snapshots, which may be stored in a non-volatile memory such as a flash disk or hard disk associated with a host 242-248 executing an instance of the database grid element 202-208.

Distribution Scheme

In one embodiment, each database grid element 202-208 stores a database shard of a database in accordance with a distribution scheme. The distribution scheme may be selected based on a default setting for a database, a default setting for a data type, another default setting, one or more optimization procedures for selecting a distribution scheme, a command received from an application, including an application instance 222-228 of a distributed application, or another method for selecting a distribution scheme.

A database shard may comprise one or more tables. Different tables may be divided based on different distribution schemes. The database may be distributed over the database grid elements 202-208 in order to spread data, co-locate data and/or localize data. In one embodiment, the distribution schemes are selected to optimize performance of one or more applications, including distributed applications, such as to reduce latency in direct mode. In one embodiment, the distribution scheme is exposed to the application through an application programming interface (API). An API may be provided for determining the appropriate database grid element 202-208 to allow application instances 222-228 to take advantage of direct mode by directly accessing the respective database shard 212-218 in memory.

In one embodiment, one or more tables are partitioned in accordance with a hash distribution scheme. In a hash distribution scheme, the one or more tables are distributed across database grid elements 202-208 based on a hash of a primary key or optional one or more columns of the one or more tables. In one embodiment, the hash distribution scheme is the default distribution scheme for one or more tables. A hash distribution scheme may be adaptive to topology changes, such as changes in the number or identity of database grid elements 202-208. In one embodiment, a particular hash distribution scheme is exposed to an application through an API that allows the application to determine the database grid element 202 comprising the shard 212-218 containing data for a given key value based on the hash distribution scheme.

In one embodiment, at least a portion of the database, such as one or more tables, is partitioned among database shards 212-218 in accordance with a reference distribution scheme. In a reference distribution scheme, the one or more tables are distributed across database grid elements 202-208 based on a hash of a foreign key column of the one or more tables. The foreign key column may be the primary key column of one or more other tables of the database. By using the foreign key column for one or more tables, related data may be co-located with respect to another set of one or more tables.

For example, orders placed by a specific customer may be co-located with other data related to the specific customer. One benefit of co-location is to avoid remote access for joins on such related tables. A reference distribution scheme may be adaptive to topology changes, such as changes in the number or identity of database grid elements 202-208. In one embodiment, a particular reference distribution scheme is exposed to an application through an API that allows the application to determine the database grid element 202 comprising the shard 212-218 containing data for a given key value based on the hash distribution scheme.

In one embodiment, at least a portion of the database, such as one or more tables, is partitioned among database shards 212-218 in accordance with a duplication distribution scheme. In a duplication distribution scheme, one or more tables, or portions thereof, are stored on multiple database grid elements 202-208. In one embodiment, identical copies of one or more tables or portions thereof are stored on all database grid elements. When multiple local copies are maintained on different database grid elements, coherency is maintained between the copies such that the copies are synchronized. A duplication distribution scheme is well suited to small, frequently accessed tables, and reduces or eliminates remote access costs. For example, some frequently accessed tables may allow more database operations to be performed in direct mode when stored locally with respect to a particular database grid element 202-208.

The above-mentioned distribution schemes are examples of distribution schemes that may be used. Other distribution schemes, including tag-based distribution schemes, range-based distribution schemes, and custom-defined distribution schemes, may be used in accordance with one or more embodiments described herein.

Applications may be configured take advantage of data placement information to obtain the best possible affinity. In one embodiment, an application is aware of the distribution scheme by which a database, such as one or more tables, is distributed across the database grid elements of the mid-tier database grid. In one embodiment, the application is allowed to specify a distribution scheme for one or more particular tables. Alternatively and/or in addition, the application may be given knowledge of the distribution scheme, such as via a mapping, an API, or any other distribution scheme that can map specific data in the one or more particular tables to specific database grid elements.

Direct Mode

Data stored in distributed database grid 200 may be accessed in direct mode. In direct mode, application instances 222-228 may directly access a corresponding database grid element 202-208 of distributed database grid 200. An application instance 222-228 that resides on the same host 242-248 as a corresponding database grid element 202-208 can directly connect to the corresponding database grid element 202-208. Thus, the application instance may read and write directly to the particular shard.

In one embodiment, applications, such as application instances 222-228, access the corresponding database grid element 202-208 in direct mode via one or more in-memory API calls. As mentioned previously, an application is developed by using pre-compiled libraries of instructions that perform many of the same functions as a database server, as well as an API for utilizing those instructions. In one embodiment, applications, such as application instances 222-228, access distributed database grid 200 in direct mode using standard SQL via JDBC (Java Database Connectivity), ODBC (Open Database Connectivity), ODP.NET (Oracle Database Provider for .NET), OCI (Oracle Call Interface), Pro*C/C++, and Oracle PL/SQL programming interfaces.

In one embodiment, applications, such as application instances 222-228, use one or more drivers 232-238 to connect to distributed database grid 200, including one or more of database grid elements 202-208. Driver 232-238 are configured to access distributed database grid 200 via existing libraries, and may include one or more direct mode drivers and/or one or more drivers that include direct mode functionality. In one embodiment, drivers 232-238 are configured to handle database requests to access distributed database grid 200, and handle both direct mode requests and remote connect mode requests.

Transparent Operation

Regardless of whether direct mode or remote connect mode is used, applications may access the mid-tier database grid as one logical database without handling any operational detail with respect to data location. In this case, the mid-tier database grid performs distributed database operations as a distributed database grid. Location transparency refers to the property that an application that needs to access a resource in a distributed system does not need to know or specify the location of the resource, such as the particular database grid element that stores a particular subset of data. Applications may submit a database request to database system 150 with location transparency.

In one embodiment, one or more of database grid elements 160-162 may be configured to handle database requests from applications that request that require access to multiple database shards. In this case, the one or more database grid elements 160-162 are configured to initiate and/or otherwise transparently manage a distributed database operation involving other database grid elements 160-162. Alternatively and/or in addition, a centralized database grid manager 170 (see FIG. 1) may be configured to handle such database requests or otherwise manage such a distributed database operation involving database grid elements 160-162.

Query Processing

A query is a request for information from a database. A query is typically submitted as a statement in a query language that is interpreted by a database server to cause one or more database operations. An access of the distributed database grid may be in the form of a query, such as a query from one or more applications. A query may be submitted in direct mode or remote connect mode; the results of the query will be identical whichever mode is used. A query may be submitted when the data necessary to handle the query is not located on a single database grid element.

When a query is submitted in direct mode via a direct connection to a specific grid element, the specific grid element will respond to the query independently of the other grid elements of the distributed database grid when the specific grid element stores all of the specific data necessary to handle the query. For example, a query comprising a read operation reads data from the specific grid element, while a query comprising a write operation writes data to the specific grid element.

In one embodiment, an application instance 222 of a distributed application is directly connected with a particular database grid element 202, where the application is partitioned based on the distribution scheme of a corresponding database. The application instance 222 may submit queries to the particular database grid element 202 over the direct connection, which will be handled completely in direct connect mode when a shard 212 of the specific grid element 202 stores all of the specific data necessary to handle the query. In one embodiment, the distributed application instances 222-228 use the distribution scheme of the database to determine whether any particular database grid element 202-208 completely contains the specific data required by the query such that the application instance that is local to the particular database grid element submits the query via a direct connection.

When no specific grid element completely contains the specific data necessary to handle the query, one of grid elements 202-208 may access the appropriate database grid elements 202-208 of distributed database grid 200. Alternatively, the application may submit the query via a distributed grid manager 170 configured to manage distributed database operations over distributed database grid 200.

Transaction Processing

A transaction includes one or more database operations that can be treated as a unit for purposes of database consistency. A transaction is atomic, consistent, isolated and durable, i.e. ACID compliant. To maintain ACID compliance, either all of the database operations of a transaction should be committed, or none should be committed. In the latter case, changes caused by the database operation should be rolled back.

When a transaction is handled, it potentially accesses multiple database grid elements, and a mechanism must be used to ensure that all database grid elements either commit or roll back the transaction on all database grid elements. In one embodiment, a two-phase commit mechanism is used to ensure commit in a distributed transaction. The communications involved in a two-phase commit mechanism cause increased latency. In the first phase, a coordinating database grid element asks each other participating database grid elements to acknowledge whether the database grid element is able to commit or roll back the transaction of and when requested to in the second phase. The participating database grid elements each prepare for the commit by proceeding with the transaction locally, generating redo records such that the database grid element can either commit or roll back the local transaction. In order to ensure that a transaction can be rolled back, a software system typically logs each operation, including the commit operation itself. Each participating database grid element notifies the coordinating database grid element if the local operations of the transaction were successfully performed or if the participating database grid element was unable to successfully perform the local operations of the transaction. In the second phase, the initiating database grid element asks all participating database grid elements to commit the transaction when each participating database grid element has successfully performed all the corresponding local operations. If this outcome is not possible, then all database grid elements are asked to roll back. Each participating database grid element commits the local portion of the distributed transaction. When the commit phase is complete, the data on all database grid elements of the distributed system is consistent.

When a transaction only involves data which resides in a single grid element, the specific grid element commits the database transaction independently, without requiring participation of another grid element of the plurality of grid elements. This allows for improved performance, such as reduced latency. In one embodiment, an application may be configured to structure transactions in an optimized manner such that, when possible, a transaction operates only on a database shard local to a single database grid element so that the transaction can be handled in direct mode, and the transaction can be committed by the single database grid element without a two-phase commit mechanism.

Failure

In one embodiment distributed database grid 200 is configured to handle failure as described below. In the case of a software failure on a database grid element 202-208, the corresponding shard 212-218 of a failed database grid element 202-208 is invalidated until the shard is reloaded, such as based on one or more checkpoint files and/or transaction log files of the failed database grid element 202-208.

In the case of a hardware failure on a host 242-248 corresponding to a database grid element 202-208, an instance of the failed database grid element 202-208 may be loaded on a new host 242-248. The corresponding shard 212-218 checkpoint files and/or transaction log files are copied or otherwise transferred or made accessible to the new host 242-248, and a new instance of the failed database grid element 202-208 is started on the new host 242-248. One or more update procedures may be performed to bring the shard 212-218 of the new database grid element 202-208 up to date, such as to conform with one or more ACID properties.

Standby and/or subscriber database grid elements may be maintained in distributed database grid 200. In one embodiment, at least one standby database grid element is maintained for each active database grid element 202-208 of distributed database grid.

Process for a Single Element Transaction

Figure 3:
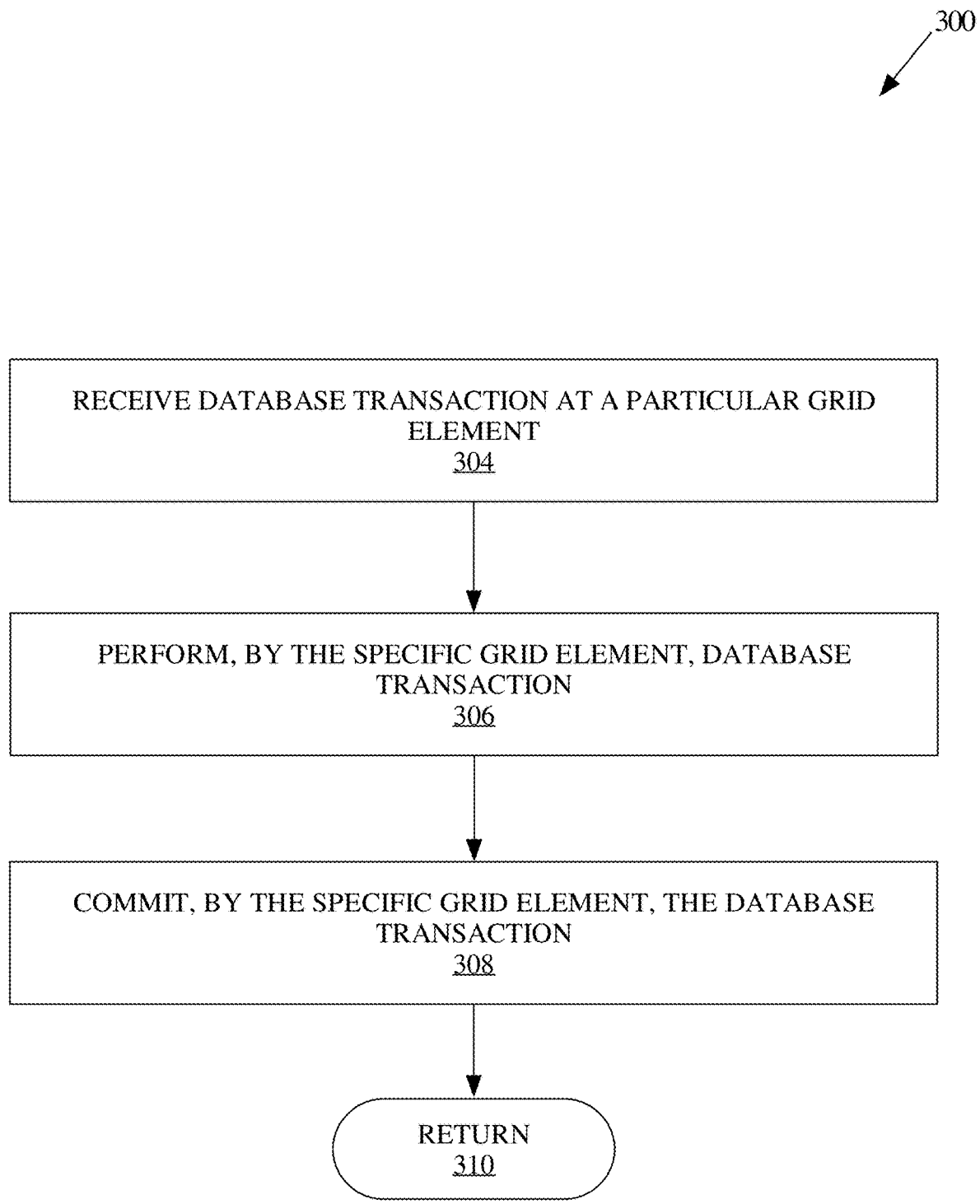
FIG. 3 is a flowchart illustrating an embodiment of a process for processing a database transaction via a direct connection.

FIG. 3 is a flowchart illustrating a process for processing a database transaction which only references data stored in a single shard which is managed by a single database element. One or more blocks of process 300 may be performed by one or more computing devices and/or processes thereof. In one embodiment, one or more blocks of process 300 is performed by one or more database grid elements, such as one or more of mid-tier database grid elements 202-208.

At block 304, a database transaction is received over either a direct mode or remote connect mode connection between an application and a particular grid element. In one embodiment, the particular grid element is a self-contained mid-tier database system. The particular grid element stores a specific database shard, and the database transaction comprises at least one database operation on the specific data. In one embodiment, the database transaction is received from an application instance of the application. In one embodiment, the application instance is partitioned in accordance with the distribution scheme of the database to take advantage of direct mode by achieving affinity between the application instance and the database shard stored by the database grid element that is local to the application instance. When an application instance of a distributed application and the particular grid element are deployed on the same computing device, the direct connection may be automatically and/or implicitly established, such as driver that enables the direct connection.

At block 306, the specific grid element performs a database transaction received over the connection with the application. The application and/or an instance thereof may include a driver configured to send one or more commands to the corresponding grid element via the direct connection. In one embodiment, the database transaction comprises at least one database operation on the specific data stored by the specific grid element, and the specific grid element performs the at least one database operation independently of the other grid elements of the distributed database grid. The database transaction may be received as a plurality of database operations, wherein the plurality of database operations includes a commit operation signaling that the database transaction is complete.

At block 308, the specific grid element commits the database transaction. The specific grid element commits the database transaction independently, without requiring participation of another grid element of the plurality of grid elements.

At block 310, process 300 returns and/or terminates. For example, processing may continue to process another database transaction in the connection, another database transaction in another connection, another distributed database transaction, another database operation, passing control to a calling process, generating any appropriate record or notification, returning after a method or function invocation, or terminating.

Process For Distributed Transaction

Figure 4:
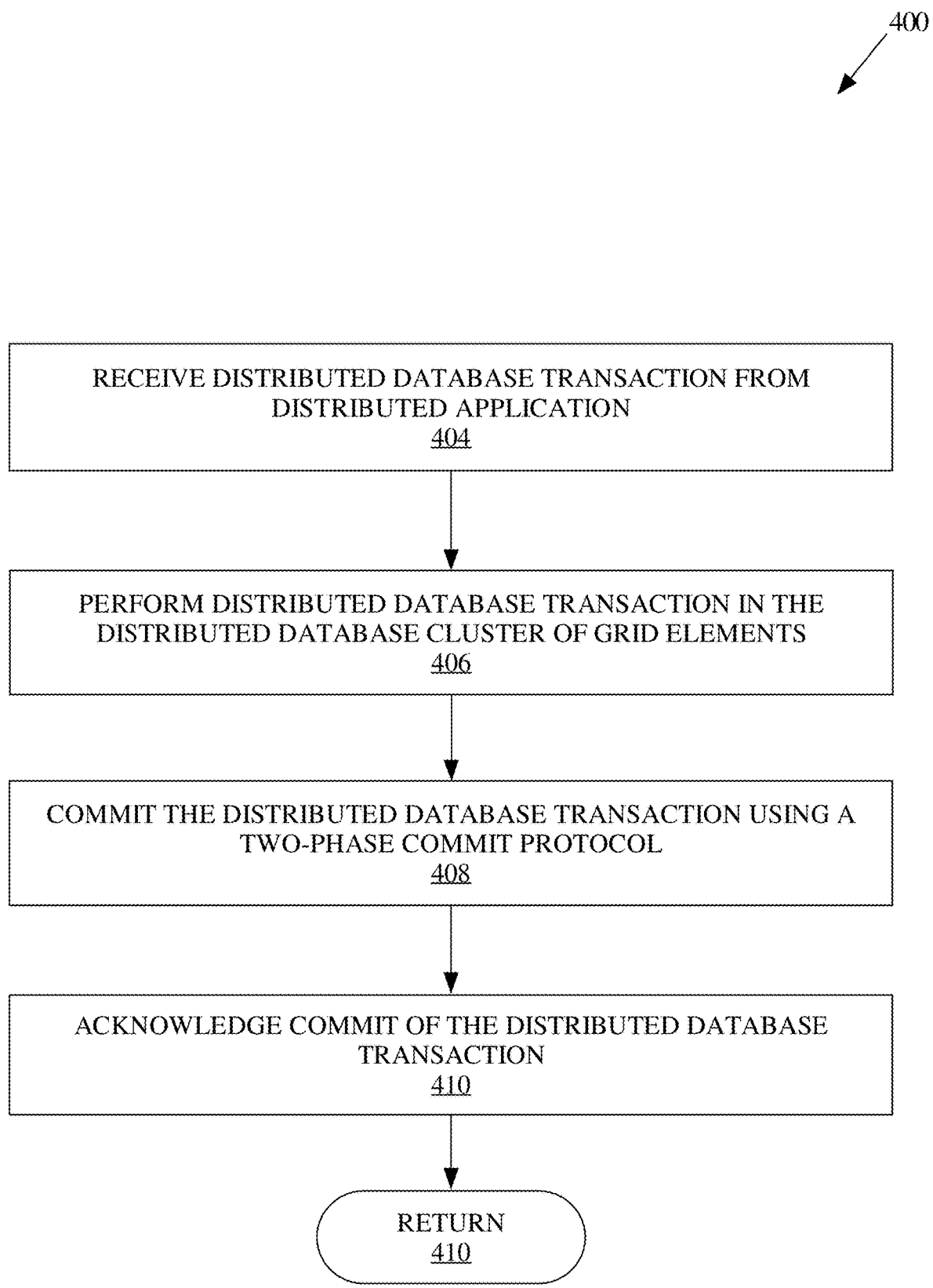
FIG. 4 is a flowchart illustrating an embodiment of a process for processing a distributed database transaction.

FIG. 4 is a flowchart illustrating an embodiment of a process for processing a distributed database transaction. Process 400 may be performed by one or more computing devices and/or processes thereof In one embodiment, one or more blocks of process 400 are performed by a plurality of database grid elements of a distributed database grid, such as database grid elements 202-208 of mid-tier database grid 200. One or more blocks of process 400 may be performed by a distributed database grid manager, such as database grid manager 170.

At block 404, a distributed database transaction is received from an application, such as an instance of a distributed application. In one embodiment, the application submits a distributed database transaction when the distribution scheme indicates that the data is distributed across multiple grid elements of a distributed database grid. In one embodiment, when the application is aware of the distribution scheme and the distribution scheme indicates that the data is distributed across multiple grid elements, the application may make a decision, such as a cost-based decision, to either submit a distributed database transaction or to access the separate data in multiple direct connections with the individual grid elements and process the separate data within the application itself.

At block 406, the distributed database transaction is performed in the distributed database grid. In one embodiment, the distributed database transaction involves two or more of the plurality of grid elements. Alternatively, the distributed database transaction may involve only one of the plurality of grid elements, such as when the application is not aware of the distribution scheme.

At block 408, the distributed database transaction is committed using a two-phase commit protocol involving the two or more of the plurality of grid elements. The two-phase commit protocol is used to ensure atomicity in distributed transactions, thereby ensuring that all database grid elements involved in the transaction either commit the distributed transaction or do not commit the distributed transaction.

At block 410, the commit of the distributed database transaction is acknowledged if the two-phase commit is successful. The acknowledgement is sent to the requester of the distributed database transaction, such as an application and/or an instance of a distributed application. Successful completion of the two-phase commit protocol is required before the acknowledgement may be sent.

At block 412, process 400 returns and/or terminates. For example, processing may continue to processing a database transaction in a direct connection, another distributed database transaction, another database operation, passing control to a calling process, generating any appropriate record or notification, returning after a method or function invocation, or terminating.

Process for Hybrid Database Access

Figure 5:
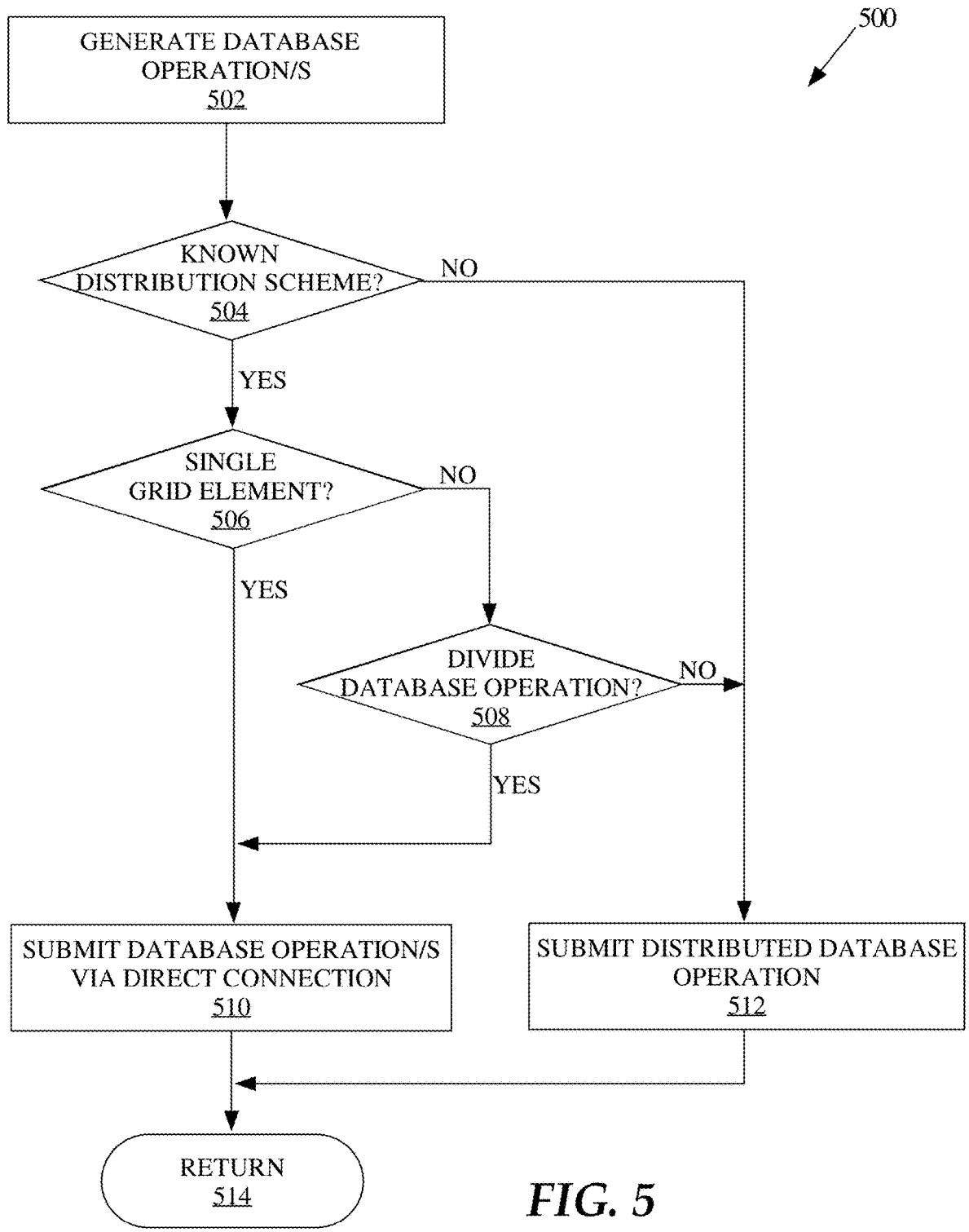
FIG. 5 is a flowchart illustrating an embodiment of a process for accessing an data stored in an embodiment of a mid-tier database grid.

FIG. 5 is a flowchart illustrating an embodiment of a process for accessing data stored in an embodiment of a mid-tier database grid. Process 500 may be performed by one or more computing devices, applications and/or processes thereof configured to access a database system that includes a mid-tier database grid such as mid-tier database grid 200. For example, one or more blocks of process 500 may be performed by a distributed application, including an instance of a distributed application.

At block 502, one or more database operations are generated by an application. For example, the one or more database operations may include one or more database queries, one or more database transactions, or any other operation that requires access to a distributed database grid comprising a plurality of database grid elements. In one embodiment, each of at least a portion of the plurality of database grid elements is a self-contained mid-tier database system.

At decision block 504, it is determined whether the one or more database operations require access to data for which the distribution scheme is known or used. For example, a distribution scheme may not be known if an application is not designed to take advantage of any distribution scheme; in this case, the application treats the database as a single logical entity. In one embodiment, the database operation may require access to one or more tables for which the distribution scheme is either known or unknown. In one embodiment, distribution data describing the distribution scheme is obtained, such as through an API. The distribution scheme and/or distribution data is usable to identify a database shard that stores specific data is located with respect to the plurality of grid elements. If the distribution scheme is not known or used, processing continues to block 512.

At block 512, a distributed database operation is submitted to the distributed database grid. In one embodiment, the distributed database operation is a distributed database transaction that is processed in accordance with process 400.

Returning to decision block 504, if it is determined that the distribution scheme is known and is used, processing continues to decision block 506. At decision block 506, the distribution scheme is used to determine whether the database operation operates on a single database grid element. In one embodiment, the determination is made by a driver via which an application submits the database operation. If it is determined that the database operation operates on a single database grid element, processing continues to block 510.

At block 510, the database operation is submitted via a direct connection to a particular database grid element identified based on the distribution scheme. In one embodiment, the database operation is processed in accordance with process 300.

Returning to decision block 506, if it is determined the database operation operates on multiple database grid elements, processing continues to decision block 508. At decision block 508, it is determined whether the database operation should be divided into sub-operations that can each be performed with a particular database grid element via a direct connection. The determination may be a cost-based decision, such as a comparison of the cost of having the distributed database grid perform the operation, as compared to the cost of performing one or more merging operations. It may be impractical, impossible and/or undesirable to divide some database operations. For example, when the database operation comprises a transaction that should be atomically committed, the distributed database grid may be best suited for ensuring such atomicity using the two-phase commit protocol. In one embodiment, the cost-based decision takes latency into account.

At block 512, process 500 returns and/or terminates. For example, processing may continue to processing another database operation, passing control to a calling process, generating any appropriate record or notification, returning after a method or function invocation, or terminating.

Database Overview

A database is a collection of logically related data and metadata. Database metadata defines database objects, such as tables, object tables, views, or complex types. From a high-level perspective, the data and metadata is organized into logical structures. For example, the data and metadata may be organized according to relational and/or object-relational database constructs.

Generally, a server, such as a database server, is a combination of integrated software components and an allocation of computational resources, such as memory, a database grid element, and processes on the database grid element for executing the integrated software components, where the combination of the software and computational resources are dedicated to providing a particular type of function on behalf of clients of the server.

A database command may be in the form of a database statement. A database command may cause one or more database operations to be performed on the database. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
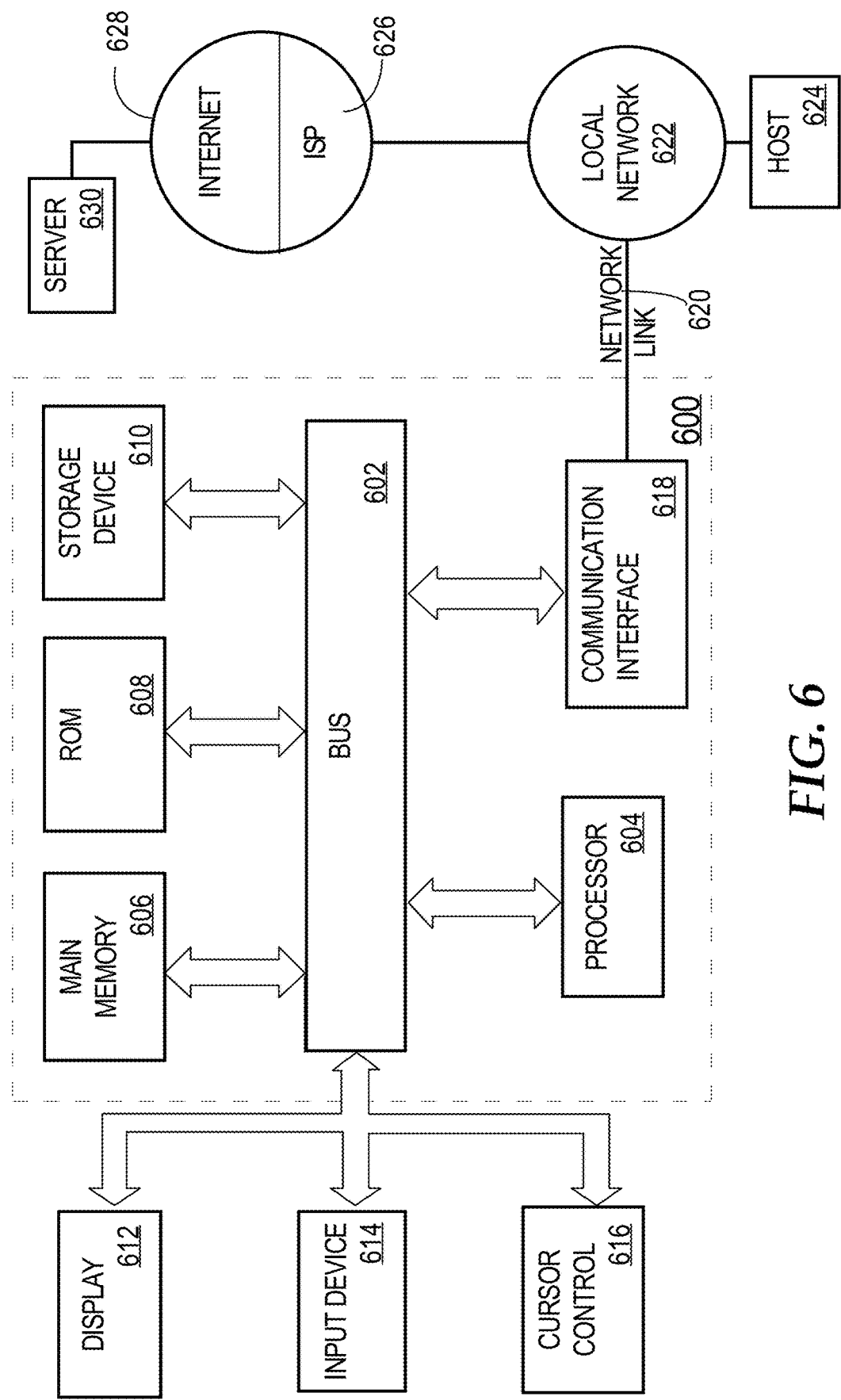
FIG. 6 illustrates a computer system upon which one or more embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM), a parameter random access memory (PRAM), or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a database as a plurality of database shards in a distributed database grid comprising a plurality of grid elements, each particular grid element of said plurality of grid elements storing a respective database shard of the plurality of database shards, running a respective proxy server for servicing requests to make changes to the respective database shard of the plurality of database shards, and having two modes:
      a remote connect mode, in which a proxy server of the particular grid element receives, from other grid elements of the plurality of grid elements, requests to access data contained within the respective database shard stored by the particular grid element, and services the access requests; and
      a direct mode, in which applications executing in the same memory space as a mid-tier database system of the particular grid element directly access the respective database shard stored by the particular grid element;
   wherein at least a subset of the plurality of grid elements each comprise a mid-tier database system;

wherein the database is distributed in accordance with a distribution scheme;

receiving, by a first grid element of the plurality of grid elements in the direct mode, from an application executing in the same memory space as a mid-tier database system of the first grid element, a first database transaction comprising at least one database operation on specific data stored in a first database shard of said plurality of database shards stored at the first grid element;

wherein the first database transaction is committed by the first grid element without participation of another grid element of the plurality of grid elements;

receiving, by the first grid element in direct mode, from said application executing in the same memory space as the mid-tier database system of the first grid element, a second database transaction, wherein the second database transaction requires making changes to data in a second database shard of said plurality of database shards that is stored in a second grid element of said plurality of grid elements, said second database transaction comprising database operations on specific data stored in said first database shard and said second database shard;

performing, by at least the first grid element in direct mode and with the respective proxy server of said second grid element in remote connect mode, the second database transaction, wherein the second database transaction comprises making said changes to the data in the second database shard;

committing the second database transaction using a two-phase commit protocol;

wherein the method is performed by one or more computing devices.

2. The method of claim 1, wherein at least a subset of the plurality of grid elements each comprise a self-contained mid-tier database system configured to store at least a portion of the database in memory and further configured to respond to database commands.

3. The method of claim 1, wherein the distribution scheme for the database is determined based on instructions from the application.

4. The method of claim 1, further comprising:
providing distribution data to the application based on the distribution scheme; and
determining, by the application, a location of the first database shard comprising the specific data.

5. The method of claim 4, wherein the distribution data is provided to the application via an API.

6. The method of claim 1, wherein the application and the distributed database grid are both implemented in a mid-tier application layer.

7. The method of claim 1, wherein the application is a distributed application, and wherein the first database transaction is received from an instance of the distributed application.

8. The method of claim 7, wherein the distributed application is partitioned based on the distribution scheme for the database.

9. The method of claim 7, wherein the distributed application comprises a plurality of application instances each comprising a driver configured to implement a direct connection with a corresponding grid element.

10. A non-transitory computer-readable medium storing instructions which, when executed by one or more processors, cause performance of:

storing a database as a plurality of database shards in a distributed database grid comprising a plurality of grid elements, each particular grid element of said plurality of grid elements storing a respective database shard of the plurality of database shards, running a respective proxy server for servicing requests to make changes to the respective database shard of the plurality of database shards, and having two modes:

a remote connect mode, in which a proxy server of the particular grid element receives, from other grid elements of the plurality of grid elements, requests to access data contained within the respective database shard stored by the particular grid element; and a direct mode, in which applications executing in the same memory space as a mid-tier database system of the particular grid element directly access the respective database shard stored by the particular grid element;

wherein at least a subset of the plurality of grid elements each comprise a mid-tier database system;

wherein the database is distributed in accordance with a distribution scheme;

receiving, by a first grid element of the plurality of grid elements in direct mode, from an application executing in the same memory space as a mid-tier database system of the first grid element, a first database transaction comprising at least one database operation on specific data stored in a first database shard of said plurality of database shards stored at the first grid element;

wherein the first database transaction is committed by the first grid element without participation of another grid element of the plurality of grid elements;

receiving, by the first grid element in direct mode, from said application executing in the same memory space as the mid-tier database system of the first grid element, a second database transaction, wherein the second database transaction requires making changes to data in a second database shard of said plurality of database shards that is stored in a second grid element of said plurality of grid elements, said second database transaction comprising database operations on specific data stored in said first database shard and said second database shard;

performing, by at least the first grid element in direct mode and with the respective proxy server of said second grid element in remote connect mode, the second database transaction, wherein the second database transaction comprises making said changes to the data in the second database shard;

committing the second database transaction using a two-phase commit protocol;

wherein the method is performed by one or more computing devices.

11. The non-transitory computer-readable medium of claim 10, wherein at least a subset of the plurality of grid elements each comprise a self-contained mid-tier database system configured to store at least a portion of the database in memory and further configured to respond to database commands.

12. The non-transitory computer-readable medium of claim 10, wherein the distribution scheme for the database is determined based on instructions from the application.

13. The non-transitory computer-readable medium of claim 10, the instructions which, when executed, further cause performance of:

providing distribution data to the application based on the distribution scheme, and determining, by the application, a location of the first database shard comprising the specific data.

14. The non-transitory computer-readable medium of claim 13, wherein the distribution data is provided to the application via an API.

15. The non-transitory computer-readable medium of claim 10, wherein the application and the distributed database grid are both implemented in a mid-tier application layer.

16. The non-transitory computer-readable medium of claim 10, wherein the application is a distributed application, and wherein the first database transaction is received from an instance of the distributed application.

17. The non-transitory computer-readable medium of claim 16, wherein the distributed application is partitioned based on the distribution scheme for the database.

18. The non-transitory computer-readable medium of claim 16, wherein the distributed application comprises a plurality of application instances each comprising a driver configured to implement a direct connection with a corresponding grid element.

19. A system comprising:
    a plurality of grid elements, each comprising at least one processor and a memory;
    wherein each particular grid element of at least a subset of the plurality of grid elements comprises a mid-tier database system and a database shard, each grid element of said plurality of grid elements running a respective proxy server for servicing requests in remote connect mode;
    wherein a database is distributed across each database shard of the plurality of grid elements in accordance with a distribution scheme;
    wherein said each particular grid element is configured to:
        receive, in direct mode, a first database transaction from an application executing in the same memory space as the mid-tier database system of the particular grid element, wherein the first database transaction comprises at least one database operation on specific data stored in the database shard of the particular grid element;
        commit the first database transaction without participation of another grid element of the plurality of grid elements; and
        receive, in direct mode, a second database transaction, wherein the second database transaction requires access to data stored in other database shards of grid elements of the plurality of grid elements other than the particular grid element;
    wherein the plurality of grid elements is configured to:
        perform the second database transaction by:
            directly accessing, by a particular grid element of the plurality of grid elements in direct mode, data stored in the database shard of the particular grid element;
            sending, from the particular grid element to another grid element of the plurality of grid elements, a request to access required data for the second database transaction stored in the database shard of the another grid element; and
            providing to the particular grid element of the plurality of grid elements, by the respective proxy server of the another grid element in the remote connect mode, access to the required data for the second database transaction stored in the database shard of the another grid element; and
        commit the second database transaction using a two-phase commit protocol.

20. The system of claim 19, wherein the application is a distributed application, and wherein the first database transaction is received from an instance of the distributed application.

* * * * *